United States Patent [19]
Slater

[11] Patent Number: 5,343,720
[45] Date of Patent: Sep. 6, 1994

[54] NO-TOW-LUNETTE EYE LOCKING DEVICE WHICH PREVENTS PENTEL HOOK CONNECTION

[76] Inventor: David R. Slater, 8 Ridge Path, Granby, Mass. 01033

[21] Appl. No.: 852,385

[22] Filed: Jun. 2, 1992

[51] Int. Cl.⁵ .................................................. B60R 25/00
[52] U.S. Cl. .......................................... 70/14; 70/58; 70/258; 280/507
[58] Field of Search ...................... 70/14, 58, 258, 386; 280/507, 515

[56] References Cited

U.S. PATENT DOCUMENTS

| | | | |
|---|---|---|---|
| 1,679,665 | 8/1928 | Junkunc | 70/386 |
| 4,158,952 | 6/1979 | Oliver et al. | 70/386 X |
| 4,186,575 | 2/1980 | Bulle | 70/14 |
| 4,440,005 | 4/1984 | Bulle | 70/14 |
| 4,441,343 | 4/1984 | Nielsen, Jr. et al. | 70/386 X |
| 4,480,450 | 11/1984 | Brown | 70/14 |
| 4,581,908 | 4/1986 | Bulle et al. | 280/507 X |

FOREIGN PATENT DOCUMENTS

| | | | |
|---|---|---|---|
| 861059 | 12/1952 | Fed. Rep. of Germany | 70/14 |
| 2510482 | 9/1976 | Fed. Rep. of Germany | 70/58 |
| 2725470 | 12/1978 | Fed. Rep. of Germany | 70/58 |
| 3150783 | 6/1983 | Fed. Rep. of Germany | 280/507 |
| 1526304 | 9/1978 | United Kingdom | 70/386 |
| 2132956 | 7/1984 | United Kingdom | 280/507 |

Primary Examiner—Lloyd A. Gall

[57] ABSTRACT

A loss-prevention device which operates by filling the hole of a lunette eye with a steel two-piece cylinder spool containing a barrel lock. Horizontal separation of the two pieces allows for the vertical removal from the lunette eye. When connected within the lunette eye, the device prevents attachment of the lunette eye's corresponding pentel hook and subsequent towing, hence, the name NO-TOW. This device can be manufactured in three sizes to accomodate the three sizes of lunette eye connectors currently in use.

5 Claims, 2 Drawing Sheets

U.S. Patent    Sep. 6, 1994    Sheet 1 of 2    5,343,720
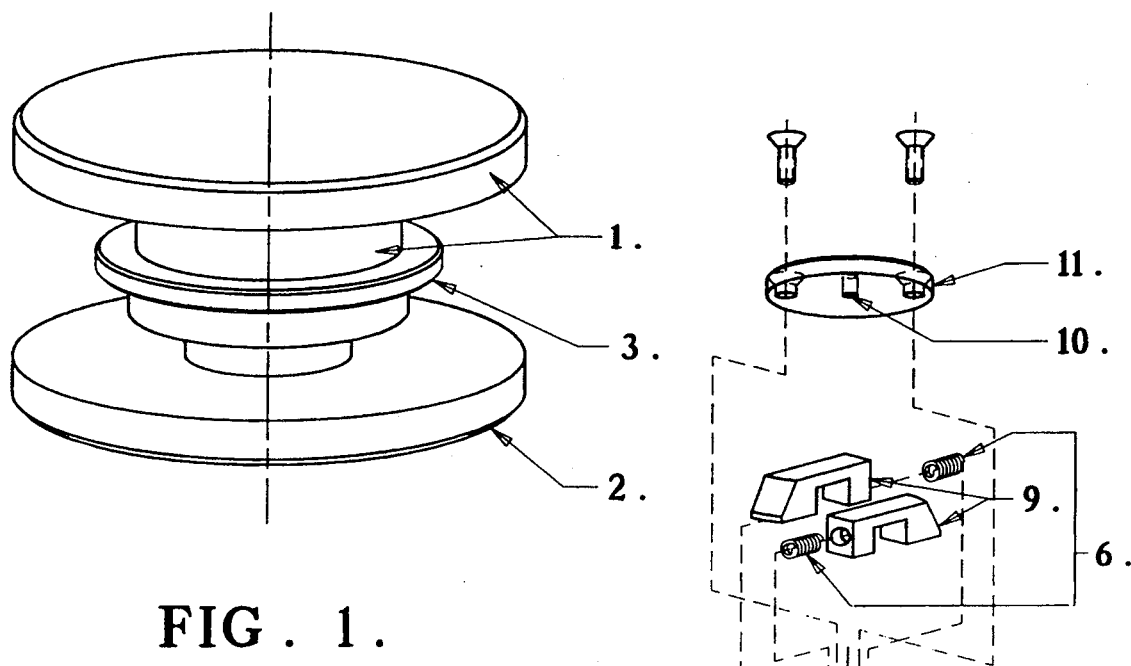
FIG. 1.
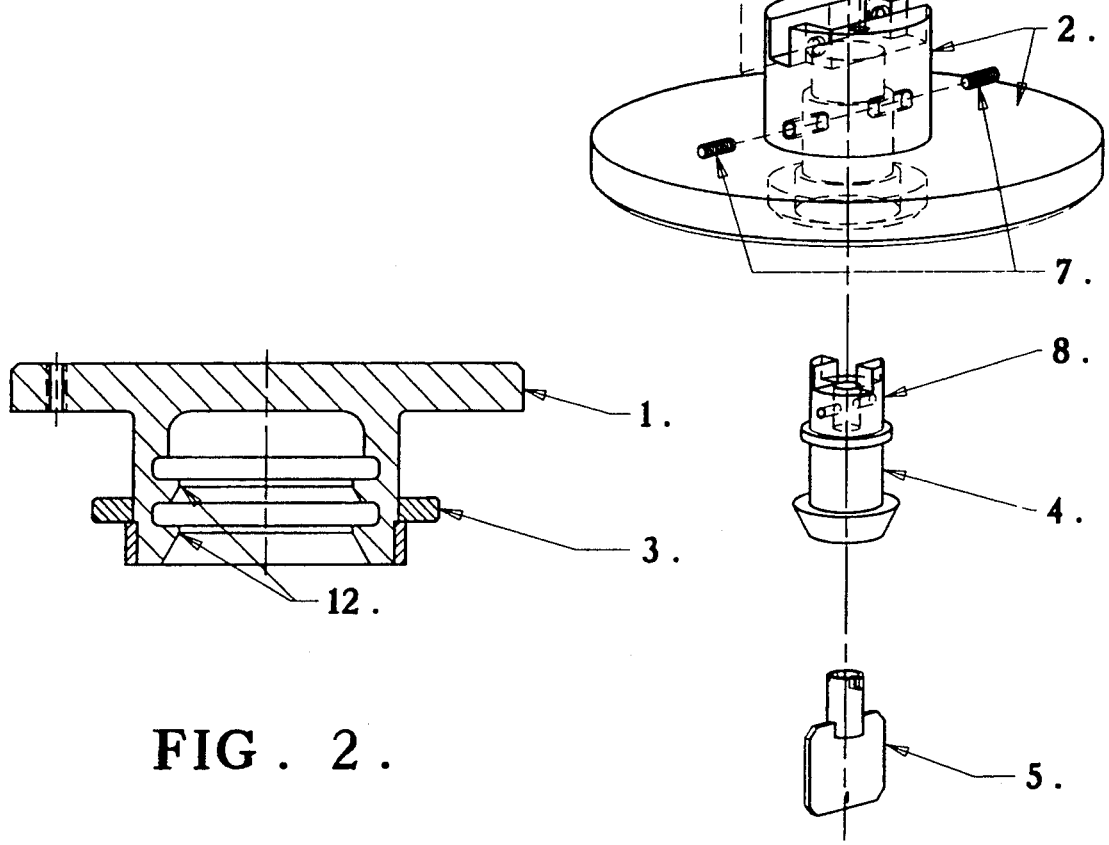
FIG. 2.
FIG. 3.

NO-TOW-LUNETTE EYE LOCKING DEVICE WHICH PREVENTS PENTEL HOOK CONNECTION

SUMMARY OF THE INVENTION

It is the object of the invention to provide a tamper-resistant locking device which blocks any connecting fit between a pentel hook and a lunette eye. A further object of the invention is to incorporate a one-size-fits-all floating ring to accomodate the three sizes of lunette eye currently in use and effectively block their connection to a pentel hook.

BRIEF DESCRIPTION OF THE DRAWINGS

The present invention will be more fully understood by reference to the following detailed description and the drawings of FIG. 1 (two-piece device, connected), FIG. 2 (cutaway view of upper housing), and FIG. 3 (cutaway view of lower insert).

FIG. 1. View of Exterior of complete device in secured position.
 1. Upper housing with coverplate
 2. Lower insert with coverplate
 3. Floating ring FIG. 2. Upper housing with floating ring showing internal machined steps for locking dogs.
 1. Three views of upper housing
 3. Floating ring '12. Machined steps FIG. 3. Lower insert with coverplate, interior cutaway view showing barrel lock mechanism.
 2. Cutaway view of lower insert with coverplate
 4. Pre-manufactured barrel lock ¾" diameter
 5. Key for pre-manufactured barrel lock
 6. Locking dogs 5/16 " square high carbon steel
 7. Allen set screws 8-32×3/16"
 8. Toggle, machined to fit underside of locking dogs
 9. Springs 1/16" diameter (2 each)
 10. Through hole 1/16" diameter for lubrication of locking dogs
 11. Dog cap to prevent displacement of sliding dogs FIG. 4. Cross-section of locking device in locked position within 2½ inch or 2⅜ inch lunette eye showing floating ring in uppermost position beneath the coverplate
 1. Upper housing-coverplate
 2. Lower insert-coverplate
 3. Floating ring FIG. 5. Cross-section of locking device in locked position within a 3 inch lunette eye showing the floating ring centered within the lunette eye.
 1. Upper housing-coverplate
 2. Lower insert-coverplate
 3. Floating ring

DETAILED DESCRIPTION

Figure 4:
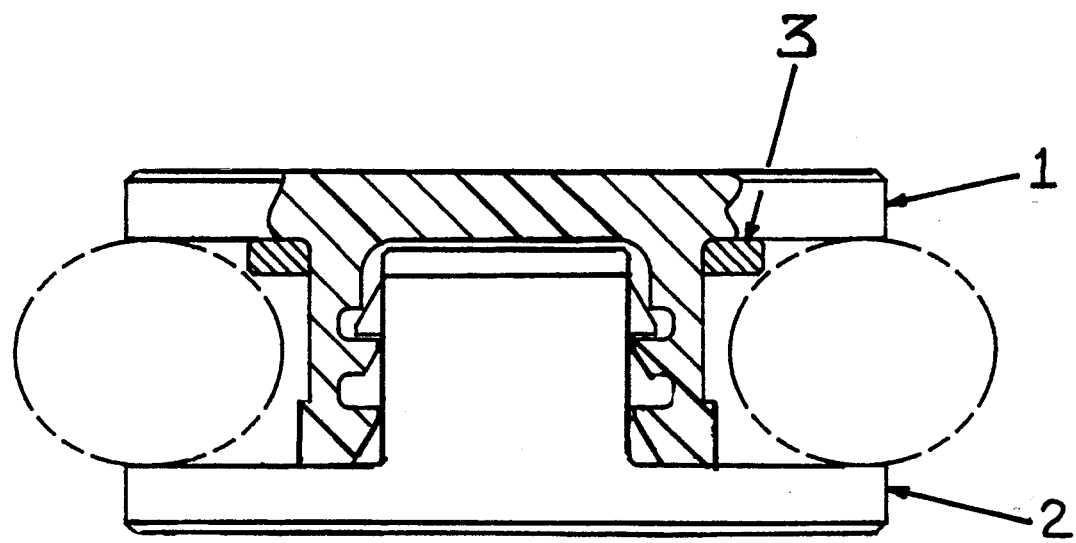
Figure 5:
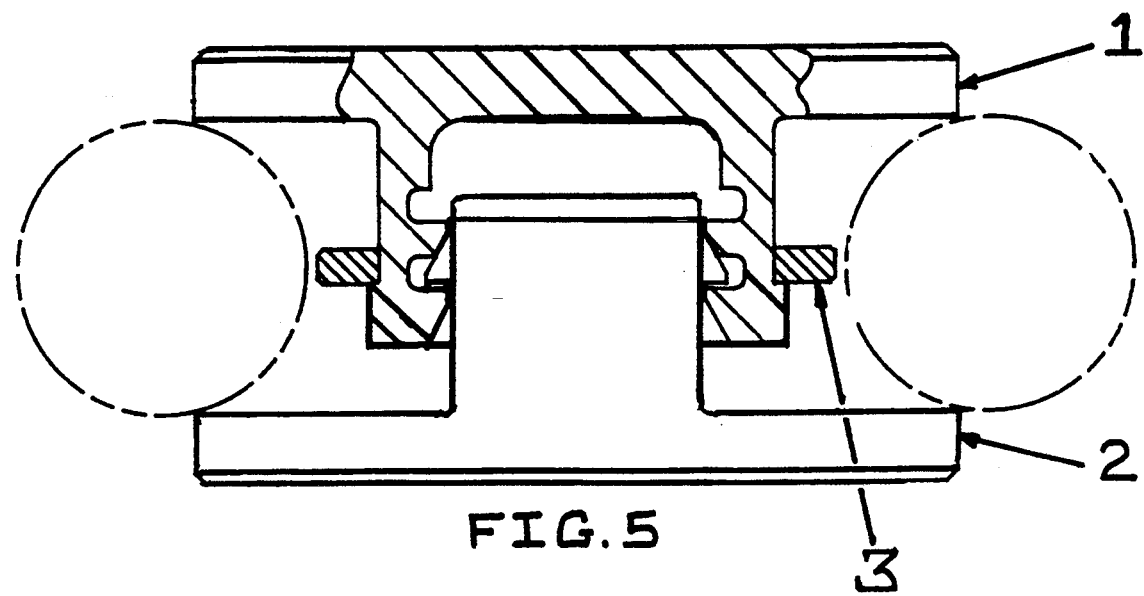

The loss-prevention blocking device which fills the hole of the lunette eye includes a two-piece cylinder spool (FIG. 1) having an upper housing with floating ring (FIG. 2) having a thickened portion of the spool forming a bottom collar (13) on which the floating ring (3) will rest in the 3" lunette eye application and lower insert (FIG. 3).

Machined in the lower insert is a keyed, pre-manufactured barrel lock (4) which when the key (5) is turned, activates two locking dogs (6) allowing either retraction (unlocked position) or expansion (locked position) of the locking dogs into machined steps (see cross-section FIG. 2) within the interior of cylinder of upper housing. The pre-manufactured barrel lock (4) is placed and secured into ¾" machined hole in the lower insert coverplate (FIG. 3, #2) using two 8-32×3/16" diameter Allen set screws (7) which fit into tapped holes fitting positively. A machined toggle (8) fits between the underside of locking dogs and the pre-manufactured barrel lock. The barrel lock key (5) moves clockwise or counter-clockwise, retracting (unlocked) or expanding (locked) the sliding locking dogs (6). By use of two 1/16" springs(9) outward pressure is maintained on the locking dogs keeping them fitted into machined steps and locked position until movement is directed with the key to the unlocked position for removal from upper housing. A 1/16" through hole (10) placed in dog cap (11) which holds locking dogs in place allows for lubrication of moveable locking dogs.

Upper housing (FIG. 2) with coverplate (1) and floating plate (3)is machined with two interior steps (12) to accept the lower insert. As lower insert is inserted, the locking dogs reach the stepped positions determined by the size of the lunette eye on which the device is being used, and expand to the wall of the upper housing (1) securing the device from separation. The two-fold purpose of the ¼" thick floating ring (3)around the cylinder body of upper housing is to center the body withing the 3" lunette eye as floating ring (3) rests on collar (13) and when used on the smaller size lunette eye (2⅜" or 2½") the ring will slide to the uppermost position beneath the coverplate (see FIG. 4).

FIG. 1 is the exterior of complete two-piece device with foating ring shown in a closed, secured position.

What I claim as my invention is:

1. A locking device for preventing use of 2⅜", 2½" and 3" eye ring trailer connectors, comprising:
an upper housing including an enlarged top coverplate and a
bottom collar to retain a flat, floating ring therebetween;
a bottom housing to be secured to the upper housing to block access to the eye ring trailer connectors;
wherein the floating ring occupies plural positions between the top coverplate and bottom collar of the upper housing when the housings are selectively secured to the 2⅜", 2½" and 3" eye ring trailer connectors.

2. The locking device of claim 1, including locking engagement means between the upper and lower housings.

3. The locking device of claim 2, wherein the locking engagement means includes key-operated locking dogs in the lower housing and engagement steps in the upper housing.

4. The locking device of claim 3, including a small hole in the lower housing for lubrication of the locking dogs.

5. The locking device of claim 1, including a bottom coverplate on the bottom housing, the top and bottom coverplates preventing access to the eye ring trailer connectors.

* * * * *